(12) United States Patent
Ginkel et al.

(10) Patent No.: US 8,572,237 B2
(45) Date of Patent: Oct. 29, 2013

(54) FAILOVER MECHANISM FOR DISTRIBUTED PROCESS EXECUTION

(75) Inventors: Thilo-Alexander Ginkel, Heidelberg (DE); Boris Klinker, Karlsruhe (DE); Matthias Miltz, Heidelberg (DE)

(73) Assignee: SAP AG, Walldorf (DE)

( * ) Notice: Subject to any disclaimer, the term of this patent is extended or adjusted under 35 U.S.C. 154(b) by 114 days.

(21) Appl. No.: 12/336,500

(22) Filed: Dec. 16, 2008

(65) Prior Publication Data

US 2010/0153481 A1    Jun. 17, 2010

(51) Int. Cl.
*G06F 15/173* (2006.01)

(52) U.S. Cl.
USPC .......................................... 709/224

(58) Field of Classification Search
USPC .......................................... 709/224
See application file for complete search history.

(56) References Cited

U.S. PATENT DOCUMENTS

| 7,039,694 | B2 * | 5/2006 | Kampe et al. | 709/222 |
| 2003/0018927 | A1 * | 1/2003 | Gadir et al. | 714/4 |
| 2008/0133687 | A1 * | 6/2008 | Fok et al. | 709/207 |
| 2008/0307265 | A1 * | 12/2008 | Vertes | 714/38 |

OTHER PUBLICATIONS

DB2, "Microsoft Cluster Server and Failover Clustering Support", retrieved from http://publib.boulder.ibm.com/infocenter/db2luw/v9/index.jsp?topic=/com.ibm.db2.udb.admin.doc/doc/c0007402.htm, accessed on Dec. 16, 2008, DB2 Version 9 for Linux, UNIX, and windows, pp. 1-2.

Bill Gettys, "Oracle Rdb Hot Standby Performance Test Results", Oracle Corporation, Aug. 15, 1999, pp. 1-10.

Wikipedia, "Hot Spare", Wikipedia, the free encyclopedia, retrieved from http://en.wikipedia.org/wiki/Hot_spare, accessed on Dec. 16, 2008, p. 1-2.

* cited by examiner

*Primary Examiner* — Kenny Lin
*Assistant Examiner* — Farhad Ali
(74) *Attorney, Agent, or Firm* — Mintz Levin Cohn Ferris Glovsky and Popeo, P.C.

(57) ABSTRACT

Methods and apparatus, including computer program products, are provided for distributed process execution. In one aspect, the computer-implemented method may provide an indication announcing that a structural change to the cluster will occur. The indication may enable at least one node of the cluster to respond with an existing view. The existing view may include a first set of authoritative data representing existing processes handled at the at least one node. The method may also include providing, to at least one of the nodes, an index representing a subsequent view of the cluster after the structural change. The subsequent view may include a second set of authoritative data representing processes handled at the at least one node after the structural change. The method may also activate the subsequent view of the cluster. Related apparatus, systems, methods, and articles are also described.

15 Claims, 3 Drawing Sheets

FAILOVER MECHANISM FOR DISTRIBUTED PROCESS EXECUTION

FIELD

The present disclosure generally relates to distributed computing.

BACKGROUND

Distributed computing systems are widely used by various organizations to accommodate the ever-increasing demand for the computer resources from consumers and businesses alike. In a distributed computing system, nodes (e.g., computers, processors, servers, etc.) are grouped, or clustered, to perform certain functions. For example, a cluster may be configured as a collection of nodes that work together to perform one or more functions and, in most instances, share a resource, such as a common database. The nodes of a cluster are usually coupled by a network.

SUMMARY

The subject matter disclosed herein provides methods and apparatus, including computer program products, for distributed process execution.

In one aspect, there is provided a computer-implemented method. In one aspect, the computer-implemented method may provide an indication announcing that a structural change to the cluster will occur. The indication may enable at least one node of the cluster to respond with an existing view. The existing view may include a first set of authoritative data representing existing processes handled at the at least one node. The method may also include providing, to at least one of the nodes, an index representing a subsequent view of the cluster after the structural change. The subsequent view may include a second set of authoritative data representing processes handled at the at least one node after the structural change. The method may also activate the subsequent view of the cluster.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
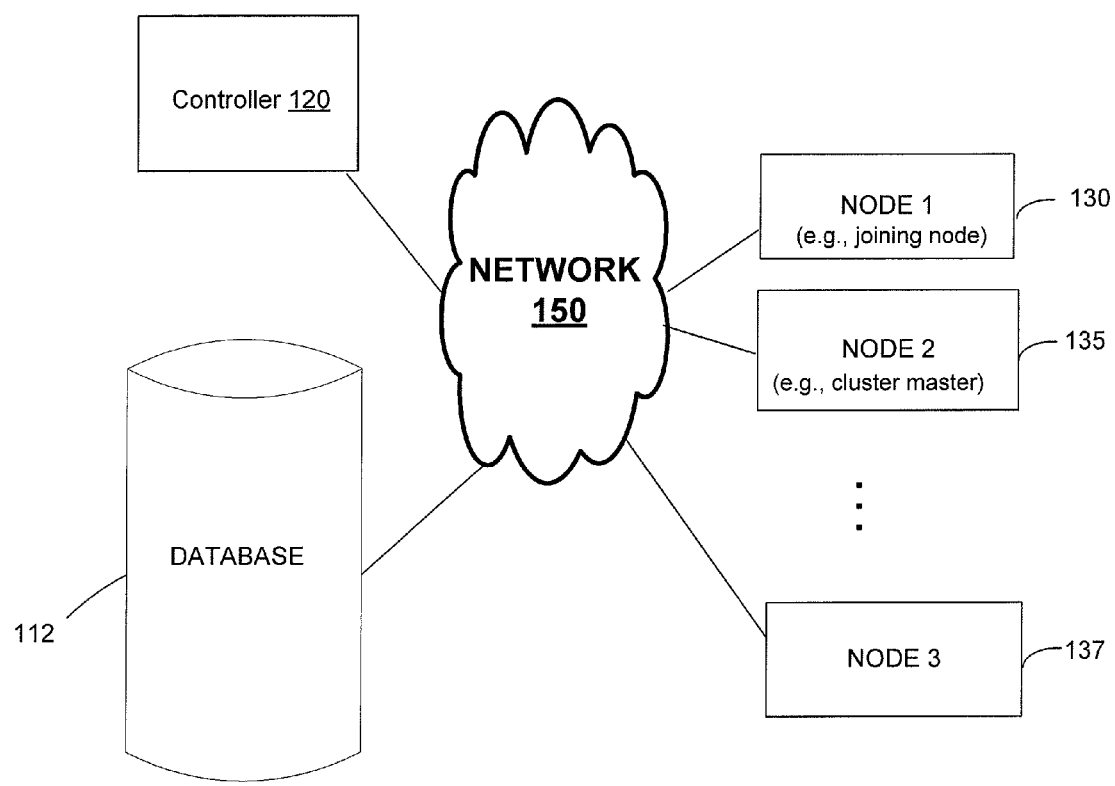
FIG. 1 depicts a block diagram of a distributed computing system, such as cluster system 100.

Like labels are used to refer to same or similar items in the drawings.

DETAILED DESCRIPTION

FIG. 1 depicts a distributed computing system, such as cluster 100. The cluster 100 may include one or more nodes, such as nodes 130-137, a controller 120 for controlling the cluster 100, and a database 112, all of which are coupled by a communication mechanism 150, such as the Internet, an intranet, or any other mechanism for communication. Although FIG. 1 only depicts three nodes of the cluster 100, other quantities of nodes may be implemented as well.

The nodes 130-137 may be implemented as any type of processor, such as a computer, a blade, a server, and the like. The nodes are also referred to as so-called "participants" in the cluster as well as a "participant node". The database 112 may be implemented as any type of database. Moreover, the nodes 130-137 may be configured as a cluster in which the nodes operate on, for example, the database 112, and/or perform one or more functions. Although controller 120 is depicted at FIG. 1 as separate from nodes 130-137, the controller 120 may be located anywhere and distributed in multiple locations (although typically a controller is included in each node). In some implementations, the controller 120 may be integrated with a cluster management system, although the controller 120 may be used independently or with other systems as well. Furthermore, although node 130 is depicted as the so-called "joining" node, any node may be node that joins or departs from cluster 100. Moreover, although node 135 is depicted as the cluster master, any node may be dynamically assigned the role of cluster master.

In a distributed execution environment involving a plurality of participants, a participant (i.e., a node) of the cluster may drop out of the cluster, may join the cluster, and/or may re-join the cluster after having dropped out of the cluster. These so-called "structural change operations" of the cluster 100 result in a change in the cluster topology (i.e., the structure of cluster 100). This structural change needs to be taken into account and thus compensated for by cluster 100. While the structural change operation is in progress and being propagated through the cluster 100, a consistent system behavior is guaranteed in the cluster 100; otherwise, cluster 100 would have an inconsistent state, at least temporarily until the structural change operation is propagated and accounted for at the nodes 130-137 of the cluster 100. The subject matter described herein relates to providing a consistent system execution environment given a change to the topology of cluster 100. In some implementations, the subject matter described herein may integrate new participants (e.g., a node) on-the-fly to accommodate an increased load. Alternatively, the subject matter described herein may transparently replace a node of the cluster 100 that has dropped out by re-distributing the processes (e.g., work, tasks, execution units, and the like) from, for example, the dropped node to the remaining nodes.

The system 100 may dynamically index processes (e.g., process instances, storage units, execution units, threads, and the like) being executed at the cluster 100 instead of pinning the processes to a specific node of the cluster. The index (which is further described below with respect to the distributed hash table) is used as an indirection to locate a process. For example, after a new topology is introduced as a result of a node joining or departing the cluster, the processes of the cluster 100 have to be reassigned to the nodes present in the cluster 100. The index serves as a mechanism to locate where the process executes on the cluster 100. Moreover, rather than send the entire index to include the new topology, in some implementation, only the changes to the index are sent to each of the nodes (e.g., implementing the changes provides the new topology). The index can thus be dynamically generated (e.g., updated, created, etc.) as a node joins or leaves the cluster 100.

A structural re-organization protocol, described below with respect to FIGS. 1 and 2, may be used to re-organize the cluster 100 topology as nodes join or depart from the cluster 100. This structural change protocol includes a so-called "cluster master," which acts as a central authority for the currently known list of cluster participants.

Figure 2:
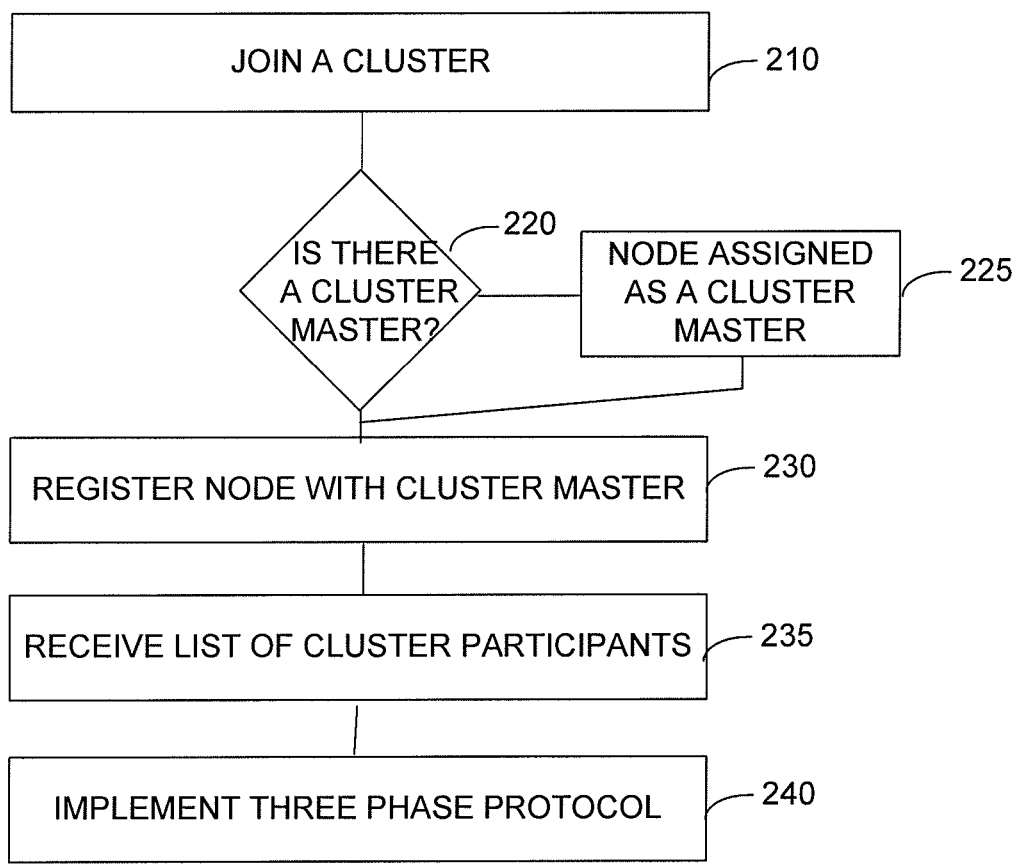
FIG. 2 depicts a process 200 for joining a cluster.

FIG. 2 depicts an example process 200 for joining a cluster 100;

At 200, a node may join a cluster 100. When joining the cluster 100, a node, such as node 130, may check to determine whether there is an existing cluster master assigned to the cluster. For example, node 130 may include, or have access to, information indicating the identity of the cluster master.

At 220, if there is no cluster master assigned to the cluster 100, a node may be assigned as the cluster master at 225. For example, the node joining the cluster 100 may be assigned the role of cluster master at 225. Thus, the election of the cluster master node may occur dynamically. At 220, if there is a cluster master assigned to the cluster 100, the node that is joining (e.g., node 130) may register with the cluster master at 230. For example, the role of cluster master may be assigned to node 135, although any other node may take on that role. After becoming a cluster master (or obtaining the identity or location of the existing master), the participant node, such as node 130, joining the cluster 100 registers itself with the cluster master. The node joining the cluster is also referred to as an "initiator," and in some implementations, the initiator initiates the structural change operation described below with respect to process 300.

At 235, in response to 230, the cluster master replies with the current list of cluster participants (e.g., the nodes 130-137 of the cluster 100). The list of cluster participants may include cluster identifiers and the corresponding locations of the nodes.

At 240, to initiate the structural change operation, the initiator (e.g., the node 130 joining the cluster) communicates (e.g., by sending a message or making a call) with all the other known participants, such as the nodes included in the list of cluster nodes described above with respect to 235. Specifically, a so-called "three-phase protocol" is utilized to implement the structural change to the cluster 100 to ensure transactional consistency for the structural change operation. While the structural change operation, the execution by the nodes continues with the previous known (i.e., before the structural change) cluster structure topology until the new structure is activated as described below.

Figure 3:
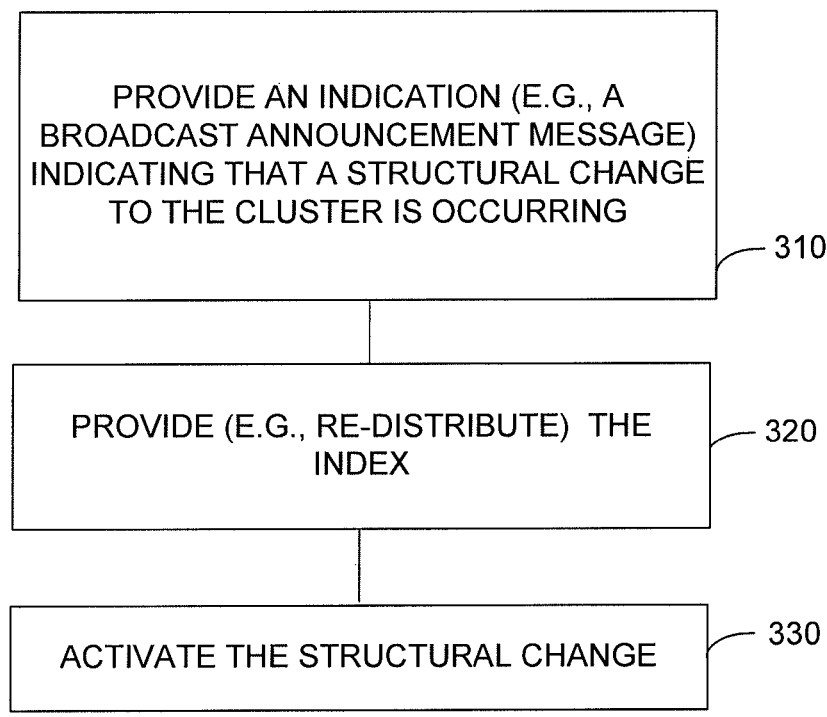
FIG. 3 depicts another process 300 for activating a structural change in the cluster 100.

FIG. 3 depicts a process 300 for a three-phase protocol used to activate a new structure at a cluster.

At 310, an indication is provided to the nodes of the cluster to announce that a structural change will be taking place. The indication may be implemented as a message, such as a broadcast message or a call, to the nodes 130-137 of the cluster 100. This first phase is thus announced to the other nodes 130-137 participating in the cluster 100. The nodes 130-137 of the cluster 100 may then prepare the so-called "view" of the topology. The view represents the network topology from the perspective of a given node. The term "topology" generally refers to the cluster participants as well as the ordering of those participants according to a sorting criterion, whereas the information returned by each participant at 310 is actually the delta of processes (e.g., process instances) a participant currently owns or owns the authoritative index for, but will no longer be authoritative for after the structural change has completed. The delta may thus refer to the processes a node is authoritative for. The complete list of processes is returned for those owned by a node. For example, a node may prepare a view (also referred to as a "snapshot") and generate an index (which is described below with respect to Table 1) and then send the changes (or metadata representing the changes) that will occur after the structural change is activated. The index generally provides a mapping from a process ID to the node, which currently executes (or owns) a process. The index address space may be distributed equally among cluster participants. The snapshot is returned to the initiator, which in this example is node 130.

Although the initiator is described as node 130, in some implementations the initiator is the controller 120. Moreover, although the controller 120 is depicted as separate from nodes 130-137, in some implementations, controller 120 is included in each of the nodes 130-137, so that each node has a control function.

At 320, an index is provided (e.g., redistributed) to the nodes of the cluster. For example, during the second phase, the initiator, such as the node 130, re-distributes to the nodes of the cluster 100 the index returned by all existing participant nodes of cluster 100. The index thus provides a snapshot view of the authoritative data (e.g., which node is responsible for handling a process) of the cluster 100 after the structural change (e.g., after a node joins or drops from the cluster 100).

At 330, the structure change is activated. For example, in the third phase, the new topology of cluster 100 is activated. Activation generally means that the new index mapping process identifiers to nodes supersedes the index that was valid prior to the structural change, and certain metadata, such as the number of cluster participants, may be updated for each node. Each node of the cluster may determine which processes it is handling given the new structural topology of cluster 100. For example, each node determines which processes it will be authoritative for after the change even before the change has been activated. The cluster 100 may use a distributed hash map to determine where the processes are located (e.g., at which node of cluster 100), and to re-allocate ownership of a process (e.g., if a process was owned by a departing node) to other nodes after a structural change. The content of the distributed hash map is separated into partitions (also referred to as so-called "buckets"), where each partition belongs to exactly one node of the cluster. While a partition belongs to exactly one node, a node may be authoritative for multiple partitions. If an index partition belongs to a given node, the node is called to the so-called "authoritative" node for this partition and all index entries (e.g., process identifiers for the processes) located in this partition.

Table 1 depicts an example of three partitions, when the cluster 100 includes three nodes and handles 100 processes (e.g., process instances). When Node 3 is dropped, Node 1 would be responsible for handling processes 1-50, and node 2 would be responsible for processes 51-100. Likewise, if Node 4 were added, Node 1 would be responsible for handling processes 1-25, Node 2 would be responsible for processes 26-50, Node 3 would be responsible for processes 51-75, and Node 4 would be responsible for processes 76-100.

TABLE 1

EXAMPLE PARTITIONS REPRESENTING NODES AND CORRESPONDING PROCESSES

| Node ID for Node 1 | Node ID for Node 2 | Node ID for Node 3 |
|---|---|---|
| Processes 1-33 | 34-66 | 67-100 |

For each process in a cluster, the index partition can be used to determine which node is responsible for handling that process, as depicted by the example of Table 1. As such, the index partitions may be used to determine, which participant node is the authoritative indexer for a given process, and the authoritative indexer has the task to maintain the current ownership state for processes. The authoritative indexer of a group keeps track of the current ownership of a process and ensures that the process has at most one owner (e.g., a node) at any given point in time. The authoritative node may be solely responsible for providing the location of a process using its part of a distributed hash table (or other like look-up mechanism), although the authoritative node may also own (i.e., execute) one or more processes as well. In some implementations, the mapping of process to partitions (which is depicted by the index of Table 1) is evenly distributed across the nodes of the cluster as depicted at Table 1, although other distributions may be used as well.

In some implementations, the index of Table 1 is implemented as a distributed hash table, although other look-up mechanisms (e.g., database look-ups, table look-ups, and the like) may be used to determine the location of a process within the cluster. For example, the authoritative indexer node may include the distributed hash table. Moreover, in some implementations, the above described process 300 does not create a bottleneck, but rather distributes the load (including the index lookups) across all participants of a cluster. Consequently, the authoritative indexer does not include the complete distributed hash table, but only its part of the hash table. The distributed hash table provides a so-called "lookup" table in which a name-value pair is stored in the distributed hash table, so that the distributed hash table can efficiently lookup a node given a key (e.g., a process identifier). As such, the distribute hash table may be used to determine the location of a process. For example, each node manages a partition of the distributed hash table, which exclusively contains processes alongside their physical location at a node. A node, which holds the information of where a particular process instance is located, is the so-called "authorative indexer" for this process instance. If node 130 wants to find out where some process instance A is located, node 130 first determines the authorative indexer of A by applying a hash function on the process identity (which is a GUID). Node 130 then sends a request to the authorative indexer to return the current physical location of process instance A. The authorative indexer retrieves this information from its hash table fragment and returns the location to node 130.

In some implementations, the cluster master, which is dynamically elected by all participants as noted above with respect to process 200, acts as an authoritative source for the current set of cluster participants. The cluster master is used during a structural change operation to provide new participants with an authoritative list of participant nodes from which to base the structural change operation.

When attempting to join the cluster 100, a participant node (also called "initiator") will first attempt to become the cluster master. The initiator does so by attempting to acquire a global lock, which represents a token used to identify the role of cluster master. If the lock acquisition is successful, there is currently no cluster master assigned to the cluster 100, and the initiator (e.g., node 130 joining cluster 100) will become cluster master by keeping the global lock, and entering a cluster master interface into a central interface registry located at controller 120. If the lock cannot be acquired, this typically means that another participant node fulfills the role of cluster master. When this is the case, the initiator node (e.g., node 130) will try to retrieve the cluster master interface from the central interface registry. In case the interface cannot be obtained but the lock was also taken, a re-mastering operation is in progress to select another cluster master (e.g., the cluster master has been assigned but the lock has not been released, or another master has already acquired the lock but has not yet published a cluster master interface in the central interface registry). After becoming cluster master or obtaining the existing cluster master, the participant node registers itself with the cluster master. In response, the cluster master replies with the list of currently known cluster participants.

Next, the new participant node (e.g., node 130) will initiate the structural change operation, as described above with respect to process 300, with all the other known participants returned by the cluster master (e.g., node 135). To do so, the new participant node 130 (referred to as the initiator) will first announce the start of a structural change by issuing a so-called "arrange" operation, where each node of the cluster (i.e., a cluster participant) is supplied with the new list of cluster participants. Upon receiving this "arrange" call, each participant will calculate a new cluster index distribution based on the new participant list. This index distribution is not immediately activated but kept in memory for later activation (e.g., activated after 330). While recalculating the cluster index distribution as described above with respect to Table 1, each participant node will also collect the identifiers of the processes (e.g., execution units) at the node (referred to as the so-called "reclaim" set) as well as those processes for which a node is authoritative for but will not "own" after the new index distribution has been activated (referred to as the so-called "relay" set). Both the reclaim set (which represents processes being kept at the node after the structural change) and the relay set (which represents processes no longer at the node after the structural change) are returned to the participant node (e.g., node 130) that has initiated the structural change. In some implementations, the "relay" set refers to processes for which a node will no longer be authoritative (but currently is), whereas the "reclaim" set refers to the processes a node currently owns (and will continue to own if its remains in the cluster). These sets will be distributed to the other participant nodes to compensate for the index changes resulting from the structural change.

The participant node, which initiated the structural change, will use the reclaim set and relay set received from all other participants and then sort the reclaim and relay sets into different partitions of the index, such as Table 1. Each partition may include all the index entries that a participant node will be responsible for after the structural change. Moreover, each partition may only include those processes, which will be added or deleted from the partition of the index at a node of cluster 100. For example, the information derived from the "reclaim" set will be used to inform the node, assigned as the new authoritative indexer, about the current ownership of a process (e.g., that a given node is going to reclaim, i.e., keep, the processes after the structural change). After preparing the index or a portion of the index e.g., a delta based on the reclaim and relay information received from the other nodes), the initiator node, such as node 130, will call all other participant nodes by issuing a so-called "restructuring" call to each of the nodes. Each of these calls will be supplied with the index delta for the respective participants. Upon receiving the "restructuring" call, a node will merge the information provided via the data into its index, such as Table 1. The structural change operation is typically finalized, or committed, by the initiator node by issuing the restructuring call on all participant nodes of the cluster. When receiving this restructuring call, each participant node switches to the new index layout of processes provided by the restructuring call, makes the new cluster topology provided to the nodes of the cluster the active topology in use by the nodes, and removes any prior index entries (and corresponding processes) from its index.

Although the above describes processes for adding a node, the departure of a node, i.e., a participant, also initiates the structural change, when the node de-registers from the cluster master as part of a departure. The departure process is similarly to the joining process described above, with a difference being the list of participants provided to the remaining participants, excludes the departing participant.

For an irregular departure of a node (e.g., a participant node dropping out of the cluster without having the opportunity to announce its departure in advance to the cluster master), each node of the cluster may receive a notification about a node departure by a controller 120 (e.g., a failure of a node may be reported by a controller 120 or another portion of cluster 100). This notification is converted into exactly one structural change operation to be propagated through the cluster 100. For this reason, only the cluster master processes the event provided and initiates the structural change operation described above with respect to processes 200 and 300 based on its list of known cluster participants (without the departed participant).

For an irregular departure of the cluster master, there is no cluster master left to initiate the structural change operation. However, any participant node of the cluster will receive a notification by the controller 120 about the irregular departure of a participant, and any participant node knows the identity of the cluster master. As such, when a node receives a notification of an irregular departure of the cluster master, the node will attempt to become the cluster master using process 200. As a consequence, all nodes may attempt to become the new cluster master, but only one node will succeed. The successful node will initiate a structural change operation based on its current view of the cluster (minus the departed previous master).

Upon departure of a participant (e.g., when there is a failure or a node is deactivated), the partitions of the index (representing which processes a node was previously responsible for) is re-distributed to all the other nodes according to the new index layout resulting from the structural change operation. However, this re-indexing may partially only applying to the index layout, but not to its contents (as a participant departing irregularly does not have a chance to hand over its current index content to the future authoritative indexers). In addition, the departing node may also have been the owner of one or more processes. To compensate for this, each node may take over the ownership for all processes it is authoritative for that were owned by a departing node. In addition to those processes that are covered by this recovery step, there may also be processes for which the departing node was both authoritative and owner. To also obtain these processes, each node may, based on the persisted state, recover all orphaned processes that are in its authoritative address space. In practice, this leaves the following three cases. First, for one or more processes which were active (i.e., lived) on the departed node O (i.e., it owned the group of processes) but the node was not authoritative for the group, another node A is authoritative for the group of processes. In this case, the one or more processes will be picked up (owned) by node A. The second case is that one or more processes were owned by node O, but the departed node A was authoritative for the group. In this case, the node O will continue to own the group (e.g., node O will announce its ownership by means of a "reclaim" request during the structural change). Another node B will become authoritative for the group of processes as per the changes to the index layout resulting from the structural change. The third case is one or more processes that lived on the departed node A, but node A was also authoritative for the group. In this case, the group of processes will be picked up by the node that becomes authoritative after the structural change initiated by node A's departure.

While a structural change operation is in progress, the current authoritative indexer for a given node needs to know when a process changes its owner, as well as the node that will become authoritative for the process after the structural change has been completed. In this case, a change of ownership is relayed from the current authoritative indexer to the future authoritative indexer. This is performed synchronously right after the authoritative indexer has updated its index, but before the request operation that leads to the change of ownership returns.

Two participating node typically communicate and thus share the same view of the cluster topology, so that the nodes consider the same participant the authoritative indexer for a given set of processes ensuring index consistency. For this reason, each request not associated with a structural change operation sent from one node to another node carries a so-called "fingerprint" with the sender's view of the cluster topology. The recipient node verifies that this view is consistent with its own view. If the recipient node determines an inconsistency, the request is rejected to be attempted again at a later point in time when the structural change operation has completed.

During the initial system start up, it may very well happen that multiple participants intend to join the cluster in close temporal proximity. To avoid any concurrency-based collisions during the structural change operations, all structural changes may be serialized using a cluster-wide lock to ensure that only a single participant may join or leave the cluster at the same point in time.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Moreover, any network topology, network protocol, and persistence may be used as well. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-implemented method comprising:
maintaining a state of a cluster comprising at least a plurality of nodes including a plurality of processors, a controller of the cluster, and a database, wherein a structural change is caused by at least one of adding a first node to the cluster and dropping a second node from the cluster, the structural change causing a change in state, wherein maintaining the state further comprises:
providing an indication announcing that the structural change to the cluster will occur, wherein the indication is provided by a node initiating the structural change, the indication enabling at least one node of the cluster to respond, after receiving a communication from the node initiating the structural change, with an existing view representing a topology defining the plurality of nodes from the perspective of the at least one node, the topology of defining an ordering of the plurality of nodes according to a sorting criterion, the existing view including a first set of authoritative data representing existing processes executed at the at least one node and processes for which the at least one node owns an authoritative index for but will not be authoritative subsequent to the structural change, wherein each node in the cluster independently determines the processes for which the node will not be authoritative for subsequent to the structural change;
providing, by the node initiating the structural change, to the plurality of nodes in the cluster an index representing a subsequent view of the cluster after the structural change, the subsequent view including a second set of authoritative data representing processes executed at the at least one node after the structural change, wherein each node in the plurality of nodes receiving the index determines at least one process, for which the node will be authoritative subsequent to the structural change; and
activating, by the node initiating the structural change, based on the index, the subsequent view of the cluster, when the provided index is received at the at least one node;
wherein, based on the activating, each node in the plurality of nodes, based on the index,
generates an index of processes that will be executed on the node;
generates a new cluster topology and provides the new cluster topology to the plurality of nodes in the cluster; and
removes at least one process identified in a previous index and the previous index associated with the node from the generated index of processes.

2. The computer-implemented method of claim 1 further comprising:
determining, by the first node joining the cluster, whether there is a cluster master assigned to the cluster.

3. The computer-implemented method of claim 2 further comprising:
assigning, based on the results of determining, the first node as the cluster master.

4. The computer-implemented method of claim 1 further comprising:
registering the first node joining the cluster with a cluster master assigned to the cluster.

5. The computer-implemented method of claim 1 further comprising:
using, as the authoritative data, a reclaim set and a relay set.

6. A non-transitory computer-readable medium including program code configured to provide operations comprising:
maintaining a state of a cluster comprising at least a plurality of nodes including a plurality of processors, a controller of the cluster, and a database, wherein a structural change is caused by at least one of adding a first node to the cluster and dropping a second node from the cluster, the structural change causing a change in state, wherein maintaining the state further comprises:
providing an indication announcing that the structural change to the cluster will occur, wherein the indication is provided by a node initiating the structural change, the indication enabling at least one node of the cluster to respond, after receiving a communication from the node initiating the structural change, with an existing view representing a topology defining the plurality of nodes from the perspective of the at least one node, the topology of defining an ordering of the plurality of nodes according to a sorting criterion, the existing view including a first set of authoritative data representing existing processes executed at the at least one node and processes for which the at least one node owns an authoritative index for but will not be authoritative subsequent to the structural change, wherein each node in the cluster independently determines the processes for which the node will not be authoritative for subsequent to the structural change;
providing, by the node initiating the structural change, to the plurality of nodes in the cluster an index representing a subsequent view of the cluster after the structural change, the subsequent view including a second set of authoritative data representing processes executed at the at least one node after the structural change, wherein each node in the plurality of nodes receiving the index determines at least one process, for which the node will be authoritative subsequent to the structural change; and
activating, by the node initiating the structural change, based on the index, the subsequent view of the cluster, when the provided index is received at the at least one node;
wherein, based on the activating, each node in the plurality of nodes, based on the index,
generates an index of processes that will be executed on the node;
generates a new cluster topology and provides the new cluster topology to the plurality of nodes in the cluster; and
removes at least one process identified in a previous index and the previous index associated with the node from the generated index of processes.

7. The non-transitory computer-readable medium of claim 6 further comprising:
determining, by the first node joining the cluster, whether there is a cluster master assigned to the cluster.

8. The non-transitory computer-readable medium of claim 7 further comprising:
assigning, based on the results of determining, the first node as the cluster master.

9. The non-transitory computer-readable medium of claim 6 further comprising:
registering the first node joining the cluster with a cluster master assigned to the cluster.

10. The non-transitory computer-readable medium of claim 6 further comprising:
using, as the authoritative data, a reclaim set and a relay set.

11. A system comprising:
a processor; and
a memory, the processor and memory configured to provide a method comprising:
maintaining a state of a cluster comprising at least a plurality of nodes including a plurality of processors, a controller of the cluster, and a database, wherein a structural change is caused by at least one of adding a first node to the cluster and dropping a second node from the cluster, the structural change causing a change in state, wherein maintaining the state further comprises:
providing an indication announcing that the structural change to the cluster will occur, wherein the indication is provided by a node initiating the structural change, the indication enabling at least one node of the cluster to respond, after receiving a communication from the node initiating the structural change, with an existing view representing a topology defining the plurality of nodes from the perspective of the at least one node, the topology of defining an ordering of the plurality of nodes according to a sorting criterion, the existing view including a first set of authoritative data representing existing processes executed at the at least one node and processes for which the at least one node owns an authoritative index for but will not be authoritative subsequent to the structural change, wherein each node in the cluster independently determines the processes for which the node will not be authoritative for subsequent to the structural change;
providing, by the node initiating the structural change, to the plurality of nodes in the cluster an index representing a subsequent view of the cluster after the structural change, the subsequent view including a second set of authoritative data representing processes executed at the at least one node after the structural change, wherein each node in the plurality of nodes receiving the index determines at least one process, for which the node will be authoritative subsequent to the structural change; and
activating, by the node initiating the structural change, based on the index, the subsequent view of the cluster, when the provided index is received at the at least one node;
wherein, based on the activating, each node in the plurality of nodes, based on the index,
generates an index of processes that will be executed on the node;
generates a new cluster topology and provides the new cluster topology to the plurality of nodes in the cluster; and
removes at least one process identified in a previous index and the previous index associated with the node from the generated index of processes.

12. The system of claim 11 further comprising:
determining, by the first node joining the cluster, whether there is a cluster master assigned to the cluster.

13. The system of claim 12 further comprising:
assigning, based on the results of determining, the first node as the cluster master.

14. The system of claim 11 further comprising:
registering the first node joining the cluster with a cluster master assigned to the cluster.

15. The system of claim 11 further comprising:
using, as the authoritative data, a reclaim set and a relay set.

* * * * *